United States Patent
Lee et al.

(10) Patent No.: US 9,621,233 B2
(45) Date of Patent: Apr. 11, 2017

(54) METHOD AND APPARATUS FOR SELECTING USER TERMINAL IN MOBILE COMMUNICATION SYSTEM

(71) Applicants: Samsung Electronics Co., Ltd., Gyeonggi-do (KR); Korea University Research and Business Foundation, Seoul (KR)

(72) Inventors: Kwang Won Lee, Seoul (KR); Inkyu Lee, Seoul (KR); Min Ki An, Seoul (KR); Kil-Bom Lee, Seoul (KR)

(73) Assignees: Samsung Electronics Co., Ltd, Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/436,442

(22) PCT Filed: Oct. 16, 2013

(86) PCT No.: PCT/KR2013/009251
§ 371 (c)(1),
(2) Date: Apr. 16, 2015

(87) PCT Pub. No.: WO2014/061995
PCT Pub. Date: Apr. 24, 2014

(65) Prior Publication Data
US 2015/0263794 A1    Sep. 17, 2015

(30) Foreign Application Priority Data

Oct. 16, 2012 (KR) ........................ 10-2012-0115085

(51) Int. Cl.
*H04B 15/00* (2006.01)
*H04B 7/024* (2017.01)
(Continued)

(52) U.S. Cl.
CPC .......... *H04B 7/024* (2013.01); *H04B 7/0452* (2013.01); *H04W 16/28* (2013.01); *H04L 1/0026* (2013.01); *H04L 1/0033* (2013.01)

(58) Field of Classification Search
CPC ....... H04B 3/32; H04B 3/23; H04L 25/03343; H04L 25/497; H04L 25/03057
(Continued)

(56) References Cited

U.S. PATENT DOCUMENTS 7,254,121 B2 *  8/2007  Kim ..................... H04B 7/2637
                                                        370/335
7,366,253 B2 *  4/2008  Kim ..................... H04B 1/7097
                                                        375/299
(Continued)

FOREIGN PATENT DOCUMENTS

KR    10-2010-0117667    11/2010
KR    10-2011-0090645    8/2011
(Continued)

OTHER PUBLICATIONS

International Search Report dated Feb. 7, 2014 in connection with International Patent Application No. PCT/KR2013/009251, 5 pages.
(Continued)

*Primary Examiner* — James M Perez

(57) ABSTRACT

Provided are a method and apparatus for user equipment (UE) selection in a mobile communication system. The method may include: selecting the $n-1^{th}$ UE in multiple cells (n: constant ≥2); and selecting a UE with the maximum weighted sum rate (WSR) as the $n^{th}$ UE from among UEs belonging to the remaining cells excluding those cells containing the $1^{st}$ to $n-1^{th}$ UEs. Hence, the scheduling function enabling suitable user equipment selection may further increase overall system throughput by providing additional gains in addition to beamforming, i.e. further reducing (Continued)

inter-cell interference and increasing signal strength toward a desired user equipment.

18 Claims, 13 Drawing Sheets

(51) Int. Cl.
  *H04B 7/0452* (2017.01)
  *H04W 16/28* (2009.01)
  *H04L 1/00* (2006.01)

(58) Field of Classification Search
  USPC .................................. 375/259–285, 295–352
  See application file for complete search history.

(56) References Cited

U.S. PATENT DOCUMENTS

| | | | | |
|---|---|---|---|---|
| 7,756,543 B2* | 7/2010 | Englund | ............. | H04W 52/143 370/318 |
| 8,098,683 B2* | 1/2012 | Kent | .................... | H04B 7/0848 370/328 |
| 8,238,299 B2* | 8/2012 | Lee | .................... | H04W 72/1231 370/329 |
| 8,279,985 B2* | 10/2012 | Liu | ....................... | H04L 1/0036 375/260 |
| 8,861,637 B2* | 10/2014 | Na | .................... | H04L 25/03343 375/232 |
| 8,942,636 B2* | 1/2015 | Gupta | ................... | H04W 28/24 370/230 |
| 9,001,918 B2* | 4/2015 | Taori | .................. | H04L 27/2626 375/137 |
| 9,172,514 B2* | 10/2015 | Wigren | ............... | H04L 27/2626 |
| 9,191,080 B2* | 11/2015 | Yokomakura | ........ | H04B 7/0413 |
| 9,331,755 B2* | 5/2016 | Castelain | ............. | H04B 7/0421 |
| 9,467,871 B2* | 10/2016 | Hwang | ................ | H04B 7/0634 |
| 9,496,939 B2* | 11/2016 | Chen | .................... | H04B 7/0689 |
| 9,497,798 B2* | 11/2016 | Kazmi | ................. | H04W 88/06 |
| 2004/0081248 A1* | 4/2004 | Parolari | ................ | H04L 1/0003 375/259 |
| 2004/0147286 A1* | 7/2004 | Kim | ...................... | H04W 36/18 455/560 |
| 2005/0213682 A1* | 9/2005 | Han | ..................... | H04B 7/0408 375/267 |
| 2009/0323849 A1* | 12/2009 | Bala | ..................... | H04B 7/0417 375/267 |
| 2010/0035555 A1* | 2/2010 | Bala | ....................... | H04B 7/024 455/63.1 |
| 2010/0239036 A1* | 9/2010 | Koo | ...................... | H04B 7/024 375/260 |
| 2010/0278225 A1* | 11/2010 | Chun | ................... | H04L 5/0007 375/224 |
| 2010/0322351 A1* | 12/2010 | Tang | ...................... | H04B 7/024 375/316 |
| 2011/0009140 A1* | 1/2011 | Hwang | ................. | H04W 16/16 455/509 |
| 2011/0059765 A1* | 3/2011 | Kim | ....................... | H04B 7/024 455/550.1 |
| 2011/0080961 A1* | 4/2011 | Hui | ........................ | H04B 7/024 375/259 |
| 2011/0164500 A1* | 7/2011 | Blomstergren | ......... | H04L 47/10 370/235 |
| 2011/0188599 A1* | 8/2011 | Kang | ....................... | H04B 7/02 375/267 |
| 2011/0194540 A1* | 8/2011 | Baligh | .................. | H04L 1/0071 370/337 |
| 2011/0294533 A1* | 12/2011 | Wong | .................... | H04W 52/12 455/522 |
| 2012/0087423 A1* | 4/2012 | Ko | .......................... | H04B 7/024 375/259 |
| 2012/0099470 A1* | 4/2012 | Li | ........................... | H04B 7/024 370/252 |
| 2012/0281780 A1* | 11/2012 | Huang | ................. | H04B 7/0452 375/267 |
| 2012/0328031 A1* | 12/2012 | Pajukoski | ......... | H04L 25/03942 375/259 |
| 2013/0016649 A1* | 1/2013 | Damnjanovic | ........ | H04W 88/04 370/315 |
| 2013/0021932 A1* | 1/2013 | Damnjanovic | ... | H04W 52/0229 370/252 |
| 2013/0034014 A1* | 2/2013 | Jonsson | ................ | H04W 24/10 370/253 |
| 2013/0094380 A1* | 4/2013 | Taoka | ................... | H04B 7/0417 370/252 |
| 2013/0094385 A1* | 4/2013 | Gunnarsson | ........ | H04W 72/085 370/252 |
| 2013/0163563 A1* | 6/2013 | Sha | ........................ | H04W 12/02 370/331 |
| 2014/0066051 A1* | 3/2014 | Xia | .................... | H04W 52/0206 455/422.1 |
| 2014/0126403 A1* | 5/2014 | Siomina | ................ | H04W 24/10 370/252 |
| 2014/0128115 A1* | 5/2014 | Siomina | ................ | H04L 1/0015 455/501 |
| 2014/0241304 A1* | 8/2014 | Ramos | .............. | H04W 72/0473 370/329 |
| 2014/0301223 A1* | 10/2014 | Wong | .................... | H04L 1/1825 370/252 |
| 2016/0330676 A1* | 11/2016 | Thangarasa | ........... | H04W 48/20 |

FOREIGN PATENT DOCUMENTS

| | | |
|---|---|---|
| KR | 10-2011-0102233 | 9/2011 |
| KR | 10-2012-0081819 | 7/2012 |
| KR | 10-2012-0102259 | 9/2012 |

OTHER PUBLICATIONS

Written Opinion of International Searching Authority dated Feb. 7, 2014 in connection with International Patent Application No. PCT/KR2013/009251, 5 pages.

Goran Dimic, et al., "On Downlink Beamforming With Greedy User Selection: Performance Analysis and a Simple New Algorithm", IEEE Transaction on Signal Processing, vol. 53, No. 10, Oct. 2005, pp. 3857-3868.

* cited by examiner

FIG. 8

| Strategies | SNR = 10 dB | | | SNR = 20 dB | | |
|---|---|---|---|---|---|---|
| | Average Cell Throughput [bps/Hz] | Median User Rate [bps/Hz] | 5%-tile User Rate [bps/Hz] | Average Cell Throughput [bps/Hz] | Median User Rate [bps/Hz] | 5%-tile User Rate [bps/Hz] |
| JP_LBF | 7.544 | 2.244 | 1.682 | 10.821 | 3.344 | 2.773 |
| Local Opt | 6.576 | 1.927 | 1.345 | 8.686 | 2.648 | 2.044 |
| FS | 6.482 | 1.901 | 1.341 | 8.269 | 2.558 | 1.945 |
| GUS | 6.344 | 1.861 | 1.341 | 7.993 | 2.434 | 1.944 |
| VUS | 6.321 | 1.853 | 1.327 | 7.894 | 2.407 | 1.924 |
| IS | 6.044 | 1.794 | 1.290 | 7.292 | 2.248 | 1.716 |

FIG. 11

| Strategies | SNR = 10 dB | | | SNR = 20 dB | | |
|---|---|---|---|---|---|---|
| | Average Cell Throughput [bps/Hz] | Median User Rate [bps/Hz] | 5%-tile User Rate [bps/Hz] | Average Cell Throughput [bps/Hz] | Median User Rate [bps/Hz] | 5%-tile User Rate [bps/Hz] |
| GUS | 7.340 | 0.662 | 0.507 | 8.720 | 0.807 | 0.667 |
| VUS | 7.326 | 0.660 | 0.505 | 8.625 | 0.795 | 0.656 |
| IS | 6.901 | 0.630 | 0.630 | 7.817 | 0.732 | 0.604 |

METHOD AND APPARATUS FOR SELECTING USER TERMINAL IN MOBILE COMMUNICATION SYSTEM

CROSS-REFERENCE TO RELATED APPLICATION(S)

The present application claims priority under 35 U.S.C. §365 to International Patent Application No. PCT/KR2013/009251 filed Oct. 16, 2013, entitled "METHOD AND APPARATUS FOR SELECTING USER TERMINAL IN MOBILE COMMUNICATION SYSTEM", and, through International Patent Application No. PCT/KR2013/009251 to Korean Patent Application No. 10-2012-0115085 filed Oct. 16, 2012, each of which are incorporated herein by reference into the present disclosure as if fully set forth herein.

TECHNICAL FIELD

The present invention relates to a method and apparatus for selecting a user equipment in a mobile communication system.

BACKGROUND ART

In recent years, as the number of users utilizing smartphones has explosively increased, the demand for mobile Internet services and multimedia has risen sharply. This has given impulse to active research, standardization, and development of improved communication systems. It is necessary for an improved communication system to have a high data rate and high frequency efficiency.

Various schemes to achieve high data rates and high frequency efficiency are under active discussion. Examples of such schemes may include: single-user and multi-user MIMO transmission, Coordinated Muli-Point (CoMP) technology aiming to increase the mean data rate within a cell and cell-edge user performance through effective interference control in cell boundary areas, and new cellular network architecture supporting a heterogeneous cell structure composed of a macrocell, picocell and femtocell to prevent performance degradation in a shadow area of an existing macro cell and to guarantee performance at a hot spot where heavy user data is generated.

In a multicell scheme raising the level of reuse of frequency and spatial resources in a mobile/wireless communication system, when communication entities transmit data independently of each other, it is inevitable for a user equipment (UE) to receive an interference signal. In particular, as a user equipment moves toward the cell edge region, the interference signal power increases and the data rate toward the base station sharply decreases.

To mitigate inter-cell interference, the base station may use a beamforming technique to adjust interference toward other cells, reducing the impact of interference on the system. Here, suitable user equipment selection by the base station may further increase overall system throughput by providing additional gains in addition to beamforming, i.e. further reducing inter-cell interference and increasing signal strength toward a desired user equipment.

DISCLOSURE OF INVENTION

Technical Problem

The present invention has been made in view of the above problems. Accordingly, an aspect of the present invention is to provide an effective method and apparatus that can select a user equipment in a mobile communication system so as to increase overall system throughput.

Solution to Problem

In accordance with an aspect of the present invention, a method for user equipment (UE) selection in a mobile communication system is provided. The method may include: selecting the n-$1^{th}$ UE in multiple cells (n: constant 2); and selecting a UE with the maximum weighted sum rate (WSR) as the $n^{th}$ UE from among UEs belonging to the remaining cells excluding those cells containing the $1^{st}$ to n-$1^{th}$ UEs.

In accordance with another aspect of the present invention, an apparatus for user equipment (UE) selection in a mobile communication system is provided. The apparatus may include a controller to control a process of selecting the n-$1^{th}$ UE in multiple cells (n: constant 2), and selecting a UE with the maximum weighted sum rate (WSR) as the $n^{th}$ UE from among UEs belonging to the remaining cells excluding those cells containing the $1^{st}$ to n-$1^{th}$ UEs.

Advantageous Effects of Invention

In a feature of the present invention, the scheduling function enabling suitable user equipment selection may further increase overall system throughput by providing additional gains in addition to beamforming, i.e. further reducing inter-cell interference and increasing signal strength toward a desired user equipment.

BRIEF DESCRIPTION OF DRAWINGS

FIG. 8 illustrates results of comparison between different schemes for a 3-cell, 2-antenna, 3-user case according to an embodiment of the present invention.

FIG. 11 illustrates results of comparison between different schemes for a 7-cell, 4-antenna, 10-user case according to an embodiment of the present invention.

Figure 12:
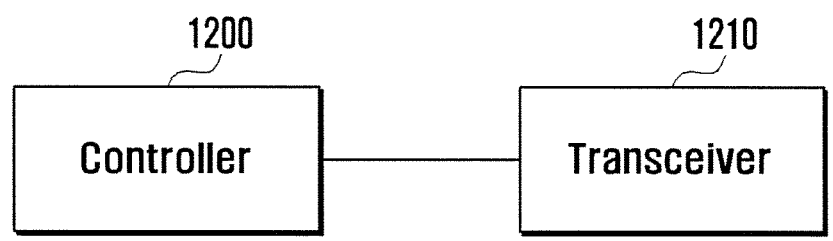

FIG. 12 is a block diagram of an apparatus for user equipment selection according to an embodiment of the present invention.

MODE FOR THE INVENTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Figure 1:
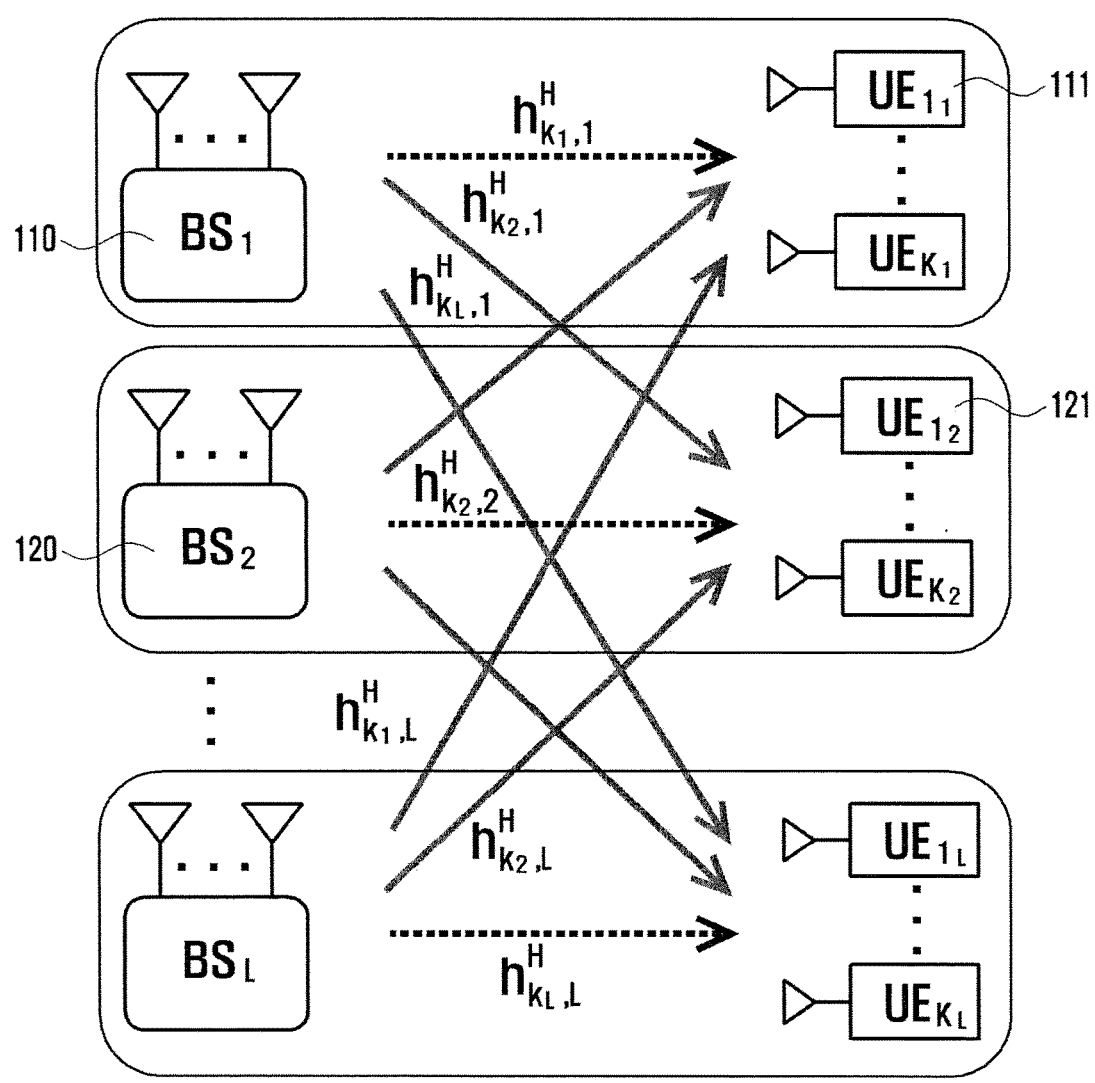
FIG. 1 illustrates a typical network Multi-Input Multi-Output (MIMO) system.

FIG. 1 illustrates a typical network Multi-Input Multi-Output (MIMO) system.

Multi-Input Multi-Output (MIMO) is related with an antenna system with a multiple input/output capability. By use of MIMO technology, base stations equipped with two or more antennas may exchange data with user equipments equipped with two or more antennas through multiple paths, achieving higher data rates. In addition, MIMO may contribute to reduction of error probability in received signals by reducing interference between receive signals through transmit signal processing.

Referring to FIG. 1, base stations (BS) 110 and 120 send signals to multiple user equipments (UE) 111 and 121 and the user equipments receive the signals. More than one user equipment may belong to each of the base stations 110 and 120.

For example, in the case of base station $BS_1$, $BS_1$ sends a signal to $UE_{k1}$, $UE_{k2}$ and $UE_{kL}$ through channels $h_{k1,1}$, $h_{k2,1}$ and $h_{kL,1}$. Here, $UE_{ki}$ denotes the $k^{th}$ user of the $i^{th}$ cell. Hence, $UE_{11}$ indicates the first user belonging to the first base station $BS_1$, $UE_{k2}$ indicates the $k^{th}$ user belonging to the second base station $BS_2$, and $UE_{kL}$ indicates the $k^{th}$ user belonging to the $L^{th}$ base station $BS_L$. In addition, $h_{ki,j}$ denotes to a channel from the $j^{th}$ base station to the $k^{th}$ user belonging to the $i^{th}$ base station.

The channel model used in the present invention is as follows.

When the $k^{th}$ user of the $i^{th}$ cell is denoted by ki, the received signal for user k may be given by the following equation.

$$y_{k_i} = \sqrt{\alpha_{k_i,i}} \bar{h}^K_{k_i,i} v_i s_{k_i} + \sum_{j=1, j \neq i}^{L} \sqrt{\alpha_{k_i,j}} \bar{h}^H_{k_i,j} v_j s_{k_j} + z_{k_1} \quad \text{[Equation 1]}$$

Figure 2:
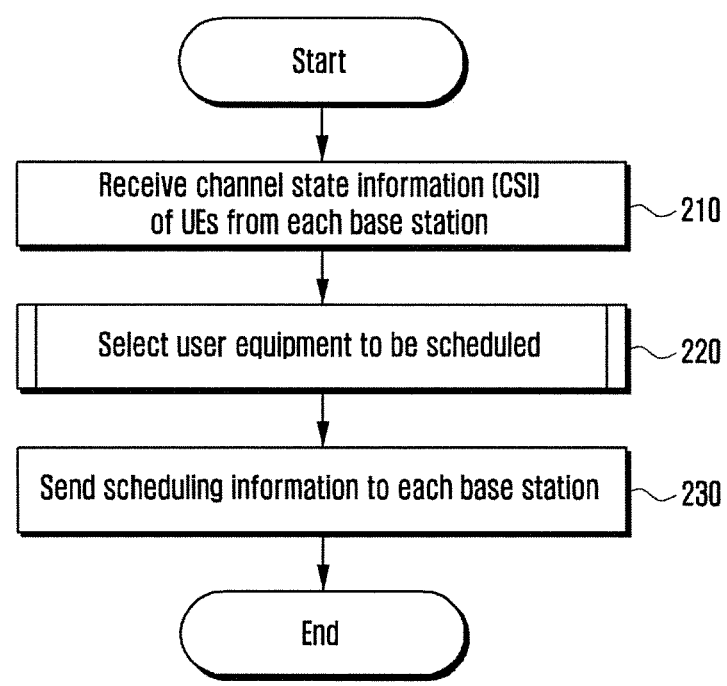
FIG. 2 illustrates a scheduling method of a central unit according to an embodiment of the present invention.

Variables are defined as follows.
$\bar{h}_{k_i,j}$: channel from BS j to user $k_i$
$v_i$: beamforming vector for BS i
$Z_{k_i}$: noise for user $k_i \sim CN(O, N_0)$
$\alpha_{k_i,j}$: received power from BS j to user $k_i$ and is determined by the following pathloss model $\alpha_{k_i,j} = \alpha_0 |d_0/d_{k_i,j}|^\beta$ $d_{k_i,j}$: distance from BS j to user $k_i$
$\alpha_0$: received power at reference distance $d_0$
$\beta$: pathloss exponent $h_{k_i,j} = \sqrt{\alpha_{k_i,j}} \bar{h}_{k_i,j}$ FIG. 2 illustrates a scheduling method of a central unit according to an embodiment of the present invention.

In the present invention, the central unit is introduced to promote coordination between the base station directly corresponding to the user and other base stations. The central unit may receive information regarding channels of user equipments and previous data from base stations and identify relationships between the base stations and user equipments on the basis of the received information. The central unit may be connected with individual base stations through backhaul links. One of the base stations may be configured as the central unit.

At step 210, the central unit receives channel state information (CSI) of each user equipment from each base station, or receives weighted virtual rate (WVR) information from each base station.

At step 220, the central unit selects a user equipment to be scheduled. Here, user equipment selection may be performed by use of the weighted sum rate (WSR) computed using the signal-to-interference-plus-noise ratio (SINR) based on global channel state information (global CSI) of all user equipments, or by use of WSVR computed by summing up WVRs received from each base station.

Operation at step 220 is described in more detail with reference to FIG. 3.

Figure 3A:
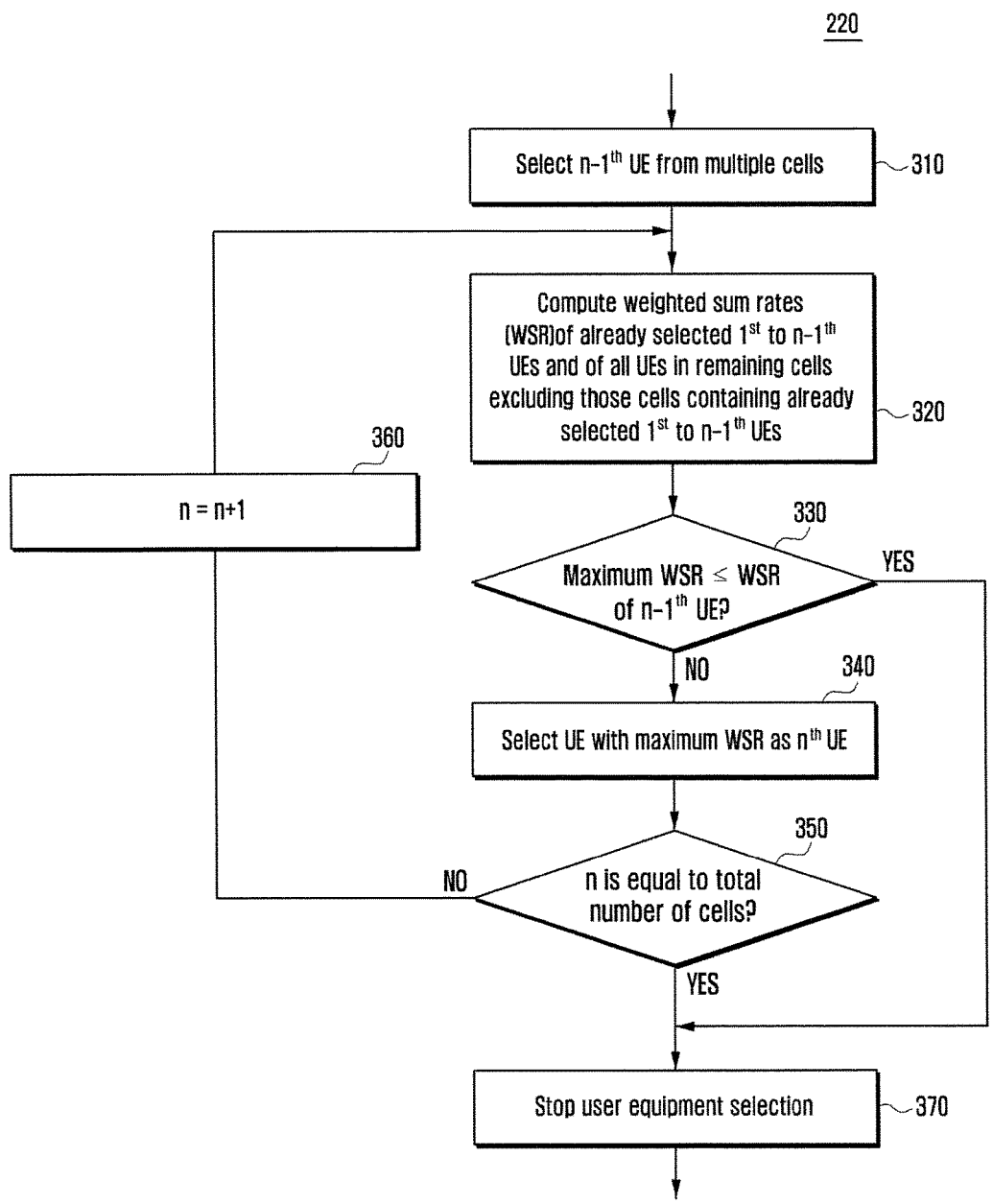
FIGS. 3A and 3B are flowcharts of a method for user equipment selection according to an embodiment of the present invention.
Figure 3B:
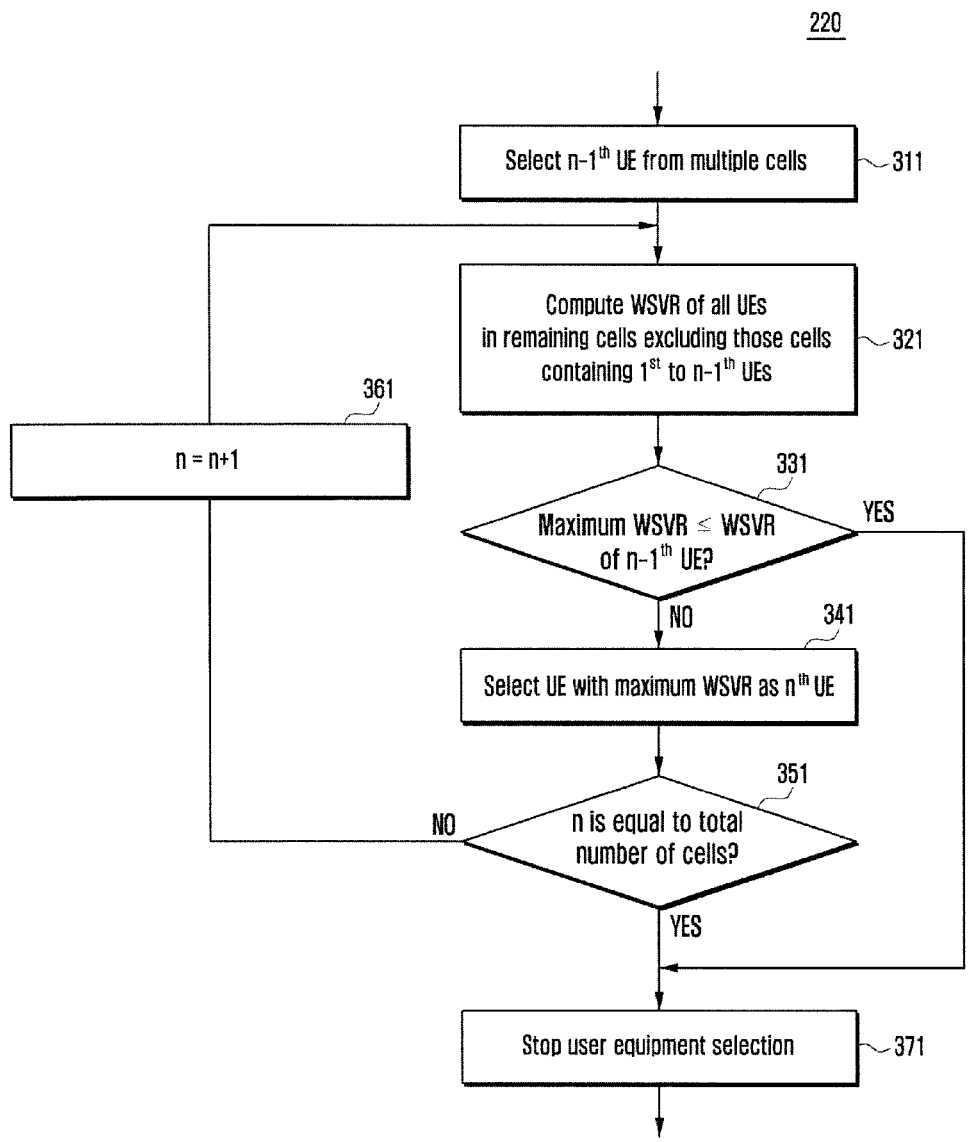

FIGS. 3A and 3B are flowcharts of a method for user equipment selection according to an embodiment of the present invention.

Firstly, referring to FIG. 3A, at step 310, the controller selects the n-1$^{th}$ UE from multiple cells connected with the central unit. Without loss of generality, the initially selected UE may be referred to as the 1$^{st}$ UE.

Here, the controller computes weighted rates (WR) of UEs belonging to each of the multiple cells, and selects a UE with the maximum WR as the 1$^{st}$ UE. More specifically, the controller may compute, for each cell, WRs of all UEs belonging to the cell, and select a UE with the maximum WR among those UEs. Selection of a UE with the maximum WR for multiple cells may be performed in various ways.

Thereafter, the controller performs an operation to select the n$^{th}$ UE in sequence.

At step 320, the controller computes WSRs of all UEs in the remaining cells excluding those cells containing the already selected 1$^{st}$ to n-1$^{th}$ UEs among the multiple cells. That is, when the base station selects UEs in sequence, it finds a UE to be added belonging to the remaining cells excluding those cells containing the already selected UEs. For example, when the 1$^{st}$ UE is selected at step 310, WSRs of all UEs belonging to the remaining cells excluding the BS to which the 1$^{st}$ UE belongs and WSR of the 1$^{st}$ UE are computed.

In the present invention, user equipment selection may be performed according to the following two embodiments.

The first embodiment for WSR computation uses global channel state information (global CSI). Beamforming is performed for all UEs belonging to the remaining cells excluding those cells containing the 1$^{st}$ to n-1$^{th}$ UEs and for the 1$^{st}$ to n-1$^{th}$ UEs, and weighted rates (WRs) of the 1$^{st}$ to n-1$^{th}$ UEs and weighted rates of all UEs belonging to the remaining cells excluding those cells containing the 1$^{st}$ to n-1$^{th}$ UEs are computed by use of the SINR computed based on the global CSI. Then, the WSR of each UE may be computed on the basis of the computed WRs. This type of embodiment may be referred to as Greedy User Search (GUS).

Initialization may be described as follows.
1) Set n=1 and $$U=U\{U_1, \ldots, U_L\} \text{ where } U_l=\{u_{l,1}, \ldots, u_{l,K}\}$$

(2) Find a user, $\overline{U}_{l,k}^{(1)}$, such that $$\overline{u}_{l,k}^{(1)} = \underset{u_{m,j} \in U}{\operatorname{argmax}} w_{m,j} R(\{u_{m,j}\})$$

3) Defining user set and group set as $S_1=\{\overline{U}_{l,k}^{(1)}\}$ and $G_1=\{U_1\}$. Denoting the achieved weighted rate as $WSR(S_1)_{max}$ where $$WSR(S_1)_{max} = \max_{u_{m,j} \in U} w_{m,j} R(\{u_{m,j}\}).$$

Here, L indicates the total number of users, and $u_{l,k}$ indicates the $k^{th}$ user at cell 1.

Such initialization may be performed at step 310. After initialization, WSR computation may be described as follows.

While n≤L
4) Increase n by 1
5) Find a user, $\overline{U}_{l,k}^{(n)}$ which maximizes the weighted sum rate such that $$\overline{u}_{l,k}^{(n)} = \underset{\substack{S_n = S_{n-1} \cup \{u_{m,j}\}, \\ u_{m,j} \in U/G_{n-1}}}{\operatorname{argmax}} WSR(S_n)_{max}$$

$$WSR(S_n)_{max} = \sum_{k_i \in S_n} w_{k_i} \log_2(1 + SINR_{k_i})$$

$$SINR_{k_i} = \frac{|h_{k_i,i}^H v_i|^2}{N_o + \sum_{j \neq i, l} |h_{k_i,j}^H v_j|^2 + |h_{k_i,l}^H v_l|^2}, \text{ and}$$

$$v_i = \left( \sum_{j \neq l} h_{k_l,i} h_{k_l,i}^H + \frac{N_o}{P} I + h_{k_l,i} h_{k_l,i}^H \right)^{-1} h_{k_l,i}$$

6) Set $S_n = S_{n-1} \cup \{\overline{u}_{l,k}^{(n)}\}$ and $G_n = G_{n-1} \cup \{U_1\}$ In this case, the controller requires global CSI to perform WSR computation. As the central unit computes the WSR using global CSI, system load is mainly concentrated on the controller of the central unit and the base station has only to notify the central unit of channel information.

In this case, the controller requires global CSI to perform WSR computation. As the central unit computes the WSR using global CSI, system load is mainly concentrated on the controller of the central unit and the base station has only to notify the central unit of channel information.

Similarly to step 310, it is possible to compute WSRs of all UEs belonging to the remaining cells excluding those BSs containing the 1$^{st}$ UE and select a UE with the maximum WSR among the UEs at step 320.

At step 330, the controller compares the maximum WSR among WSRs computed for the UEs at step 310 with the WSR of the n-1$^{th}$ UE. If the maximum WSR is less than or equal to the WSR of the n-1$^{th}$ UE, the procedure proceeds to step 370 at which the controller stops user equipment selection. Here, the n-1$^{th}$ UE becomes the last selected UE. That is, following the above step, 7) If $WSR(S_n)_{max} \leq WSR(S_{n-1})_{max}$ break; and decrease n by 1.

If the maximum WSR is greater than the WSR of the n-1$^{th}$ UE, the procedure proceeds to step 340 at which the controller selects the UE with the maximum WSR as the n$^{th}$ UE. At step 350, the controller checks whether n is equal to the total number of cells. If n is equal to the total number of cells, the procedure proceeds to step 370 at which the controller stops user equipment selection. Here, the n$^{th}$ UE becomes the last selected UE.

If n is not equal to the total number of cells, the procedure proceeds to step 360 at which the central unit increases n by 1. Thereafter, the procedure returns to step 320 to select the n+1$^{th}$ UE.

Referring back to FIG. 2, at step 230, the central unit sends scheduling information to each base station. The base stations may communicate with user equipments adequately selected by the central unit according to the scheduling information. Hence, it is possible to increase overall system throughput by providing additional gains in addition to scheduling via beamforming, i.e. further reducing inter-cell interference and increasing signal strength toward a desired user equipment.

To solve the above problem, referring to FIG. 3B, in the second embodiment, local channel state information (local CSI) is used for user equipment selection. Hence, it is possible to reduce system load on the central unit and to reduce the amount of information exchanged between the base station and the central unit while maintaining system performance. In the second embodiment for user equipment selection, instead of using global CSI for WSR computation, local CSI is used by each base station to compute the weighted virtual rate (WVR). The controller may receive WVRs of user equipments belonging to each cell from the cell and compute the weighted sum virtual rate (WSVR) using the received WVRs. This type of embodiment may be referred to as Virtual rate User Search (VUS).

In this case using WSVR, initialization is partially altered.
1) Set n=1 and $$U=U\{U_1, \ldots, U_L\} \text{ where } U_l=\{u_{l,1}, \ldots, u_{l,K}\}$$

2) Find a user, $\overline{U}_{l,k}^{(1)}$, such that $$\overline{u}_{l,k}^{(1)} = \underset{u_{m,j} \in U}{\operatorname{argmax}} w_{m,j} R(\{u_{m,j}\})$$

3) Defining user set and group set as $S_1=\{U_{l,k}^{(1)}\}$ and $G_1=\{U_1\}$. Denoting the achieved weighted rate as WSVR $(S_1)_{max}$ where $$WSVR(S_1)_{max} = \max_{u_{m,j} \in U} w_{m,j} R(\{u_{m,j}\})$$

Here, L indicates the total number of users, indicates the cell and k indicates the user.

Initialization is almost the same as the case of the first embodiment, however, when the 1$^{st}$ UE is selected, not WSRs but WSVRs are computed for UEs belonging to the remaining cells excluding the BS to which the 1$^{st}$ UE belongs.

After initialization, WSVR computation may be described as follows.

While n≤L

4) Increase n by 1

5) Find a user, $\overline{U}_{l,k}^{(n)}$ which maximizes the weighted sum rate such that $$\overline{u}_{l,k}^{(n)} = \underset{\substack{S_n = S_{n-1} \cup \{u_{m,j}\}, \\ u_{m,j} \in U/G_{n-1}}}{\operatorname{argmax}} WSVR(S_n)_{max}$$

$$WSVR(S_n)_{max} = \sum_{k_i \in S_n} w_{k_i} \log_2 \Pi_i^{-1} \text{ where}$$

$$\Pi_i = 1 - h_{k_i,i}^H \left( \sum_{j \neq i} h_{k_j,i} h_{k_j,i}^H + \frac{N_o}{P} I + h_{k_l,i} h_{k_l,i}^H \right)^{-1} h_{k_i,i}$$

6) Set $S_n = S_{n-1} \cup \{\overline{u}_{l,k}^{(n)}\}$ and $G_n = G_{n-1} \cup \{U_1\}$ As described above, it can be seen that user equipment selection is possible by use of the WVR concept based on local CSI instead of WSR based on SINR. In the second embodiment, each base station may directly compute the WVR without use of global CSI and without conducting beamforming, reducing load on the central unit.

In the second embodiment, as global CSI is unnecessary, the WVR may be separately computed by each base station and delivered to the central unit. Here, as the WSVR is a scalar value and the amount of information exchanged between base stations is much smaller in comparison to existing channel information, transmission load between base stations is not high. In this case, the central unit computes the WSVR on the basis of WVRs and performs user equipment selection.

Similarly to step 311, it is possible to compute WSVRs of all UEs belonging to the remaining cells excluding those BSs containing the 1$^{st}$ UE and select a UE with the maximum WSVR among the UEs at step 321.

At step 331, the controller compares the maximum WSVR among WSVRs computed for the UEs at step 311 with the WSVR of the n−1$^{th}$ UE. If the maximum WSVR is less than or equal to the WSVR of the n−1$^{th}$ UE, the procedure proceeds to step 371 at which the controller stops user equipment selection. Here, the n−1$^{th}$ UE becomes the last selected UE. That is, following the above step, 7) If $WSVR(S_n)_{max} \leq WSVR(S_{n-1})_{max}$ break; and decrease n by 1.

If the maximum WSVR is greater than the WSVR of the n−1$^{th}$ UE, the procedure proceeds to step 341 at which the controller selects the UE with the maximum WSVR as the n$^{th}$ UE. At step 351, the controller checks whether n is equal to the total number of cells. If n is equal to the total number of cells, the procedure proceeds to step 371 at which the controller stops user equipment selection. Here, the n$^{th}$ UE becomes the last selected UE.

If n is not equal to the total number of cells, the procedure proceeds to step 361 at which the central unit increases n by 1. Thereafter, the procedure returns to step 321 to select the n+1$^{th}$ UE.

Referring back to FIG. 2, at step 230, the central unit sends scheduling information to each base station. The base stations may communicate with user equipments adequately selected by the central unit according to the scheduling information. Hence, it is possible to increase overall system throughput by providing additional gains in addition to scheduling via beamforming, i.e. further reducing inter-cell interference and increasing signal strength toward a desired user equipment.

FIGS. 4 to 11 are illustrations demonstrating improved effects.

Figure 4:
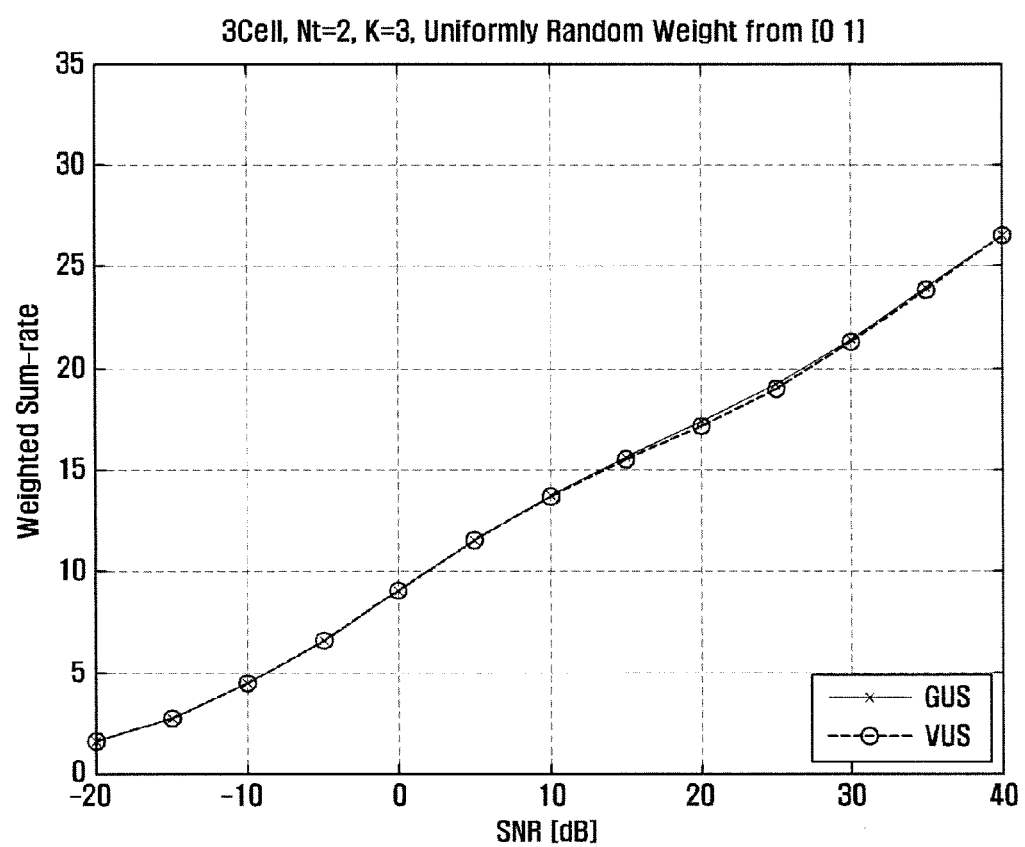
FIG. 4 illustrates weighted sum rates (WSR) of the method for user equipment selection with 3 cells, 2 antennas and 3 users according to an embodiment of the present invention.
Figure 5:
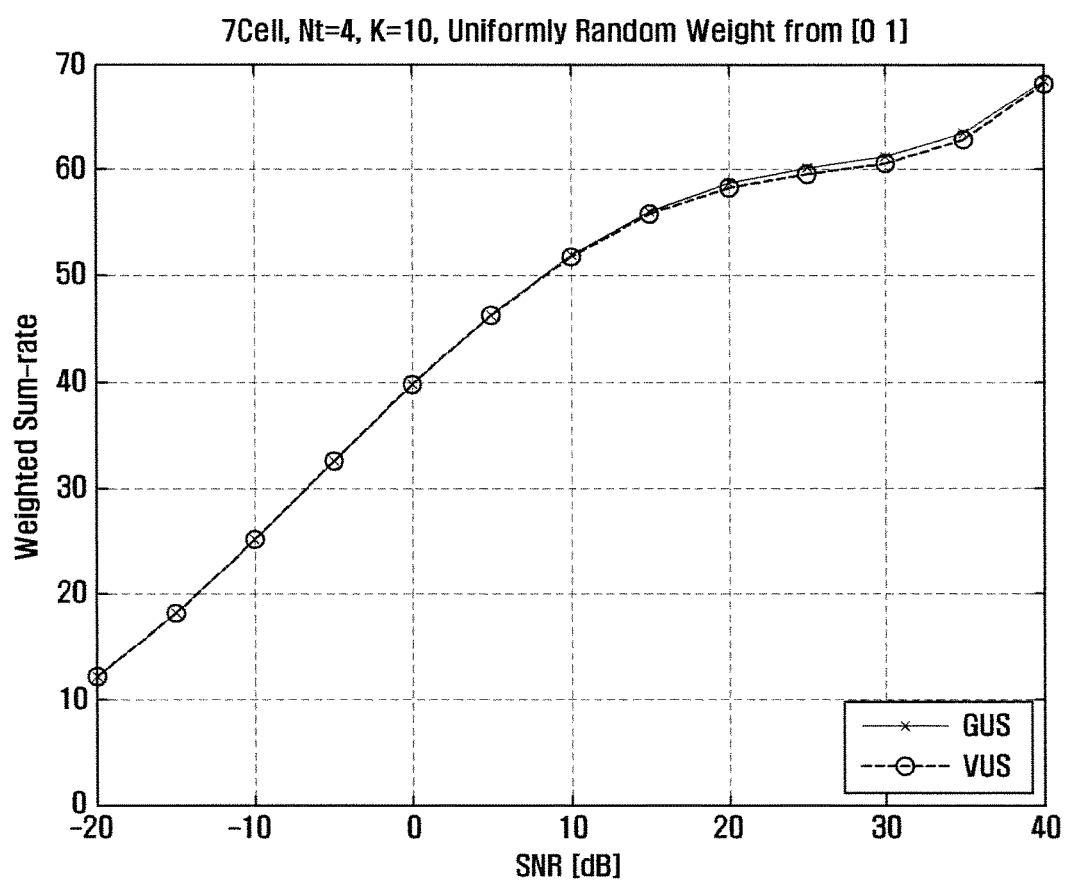
FIG. 5 illustrates weighted sum rates (WSR) of the method for user equipment selection with 7 cells, 4 antennas and 10 users according to an embodiment of the present invention.

FIGS. 4 and 5 illustrate performance of the embodiments of the present invention in terms of SNR. FIG. 4 illustrates the average weighted sum rate (WSR) of the method for user equipment selection with 3 cells, 2 antennas and 3 users according to an embodiment of the present invention, and FIG. 5 illustrates the average weighted sum rate (WSR) of the method for user equipment selection with 7 cells, 4 antennas and 10 users according to an embodiment of the present invention.

As can be seen from FIGS. 4 and 5, performance of the first embodiment does not significantly differ from that of the second embodiment although the number of cells, antennas and users differs.

Figure 6:
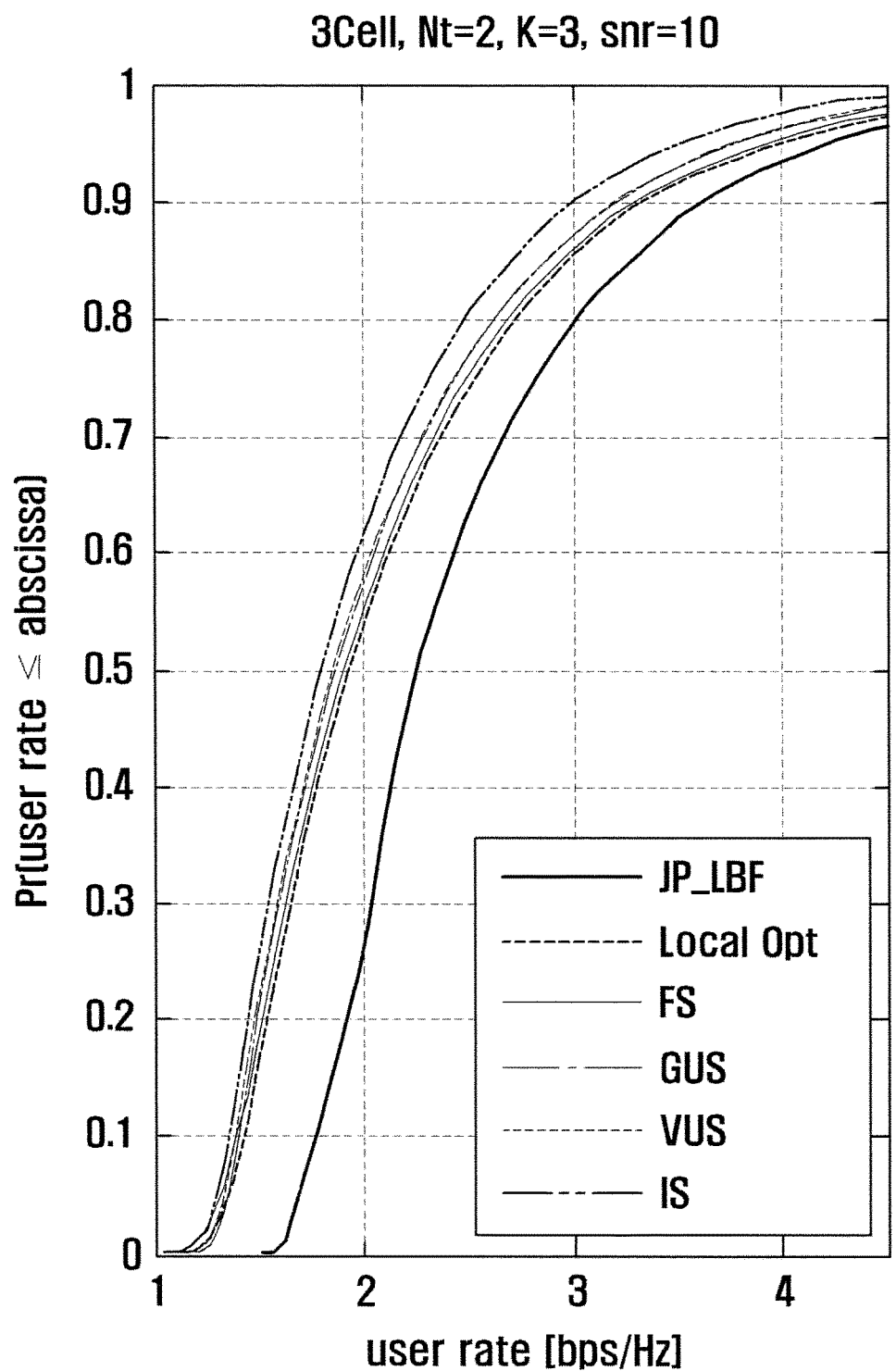
FIG. 6 shows the cumulative distribution function (CDF) of the method for user equipment selection with 3 cells, 2 antennas, 3 users and an SNR of 10 according to an embodiment of the present invention.
Figure 7:
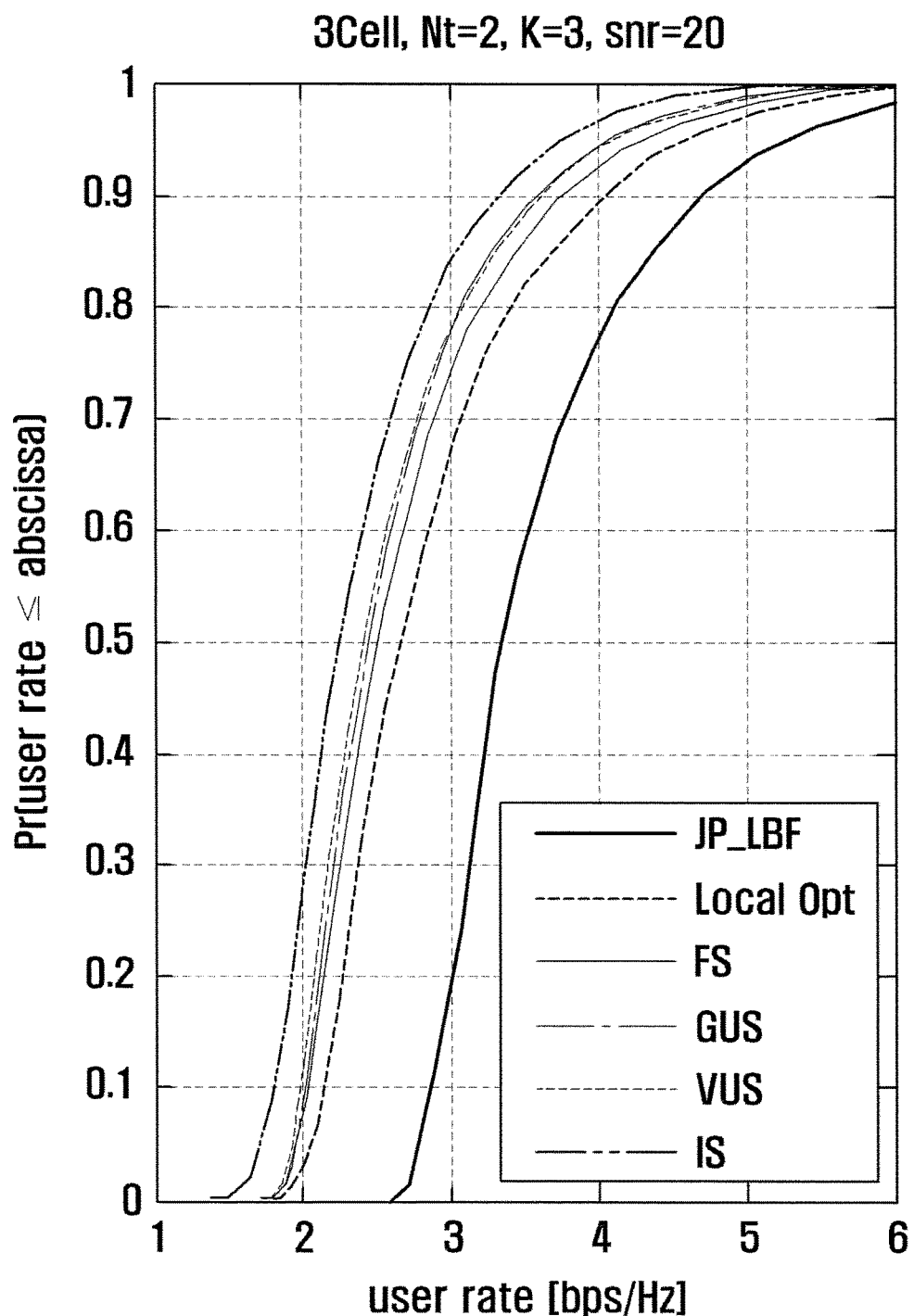
FIG. 7 shows the cumulative distribution function (CDF) of the method for user equipment selection with 3 cells, 2 antennas, 3 users and an SNR of 20 according to an embodiment of the present invention.

FIGS. 6 and 7 illustrate performance of the embodiments of the present invention in terms of CDF. FIG. 6 shows the cumulative distribution function (CDF) of the method for user equipment selection with 3 cells, 2 antennas, 3 users and an SNR of 10 according to an embodiment of the present invention, and FIG. 7 shows the cumulative distribution function (CDF) of the method for user equipment selection with 3 cells, 2 antennas, 3 users and an SNR of 20 according to an embodiment of the present invention.

As can be seen from FIGS. 6 and 7, performance of the first embodiment does not significantly differ from that of the second embodiment although the SNR differs. FIGS. 6 and 7 also show that the user selection method of the present invention exhibits performance similar to that of other existing schemes. This can be more clearly seen from FIG. 8.

FIG. 8 illustrates results of comparison between different schemes for a 3-cell, 2-antenna, 3-user case according to an embodiment of the present invention.

Referring to FIG. 8, although the embodiments of the present invention (GUS and VUS) exhibit somewhat different results in comparison with "JP_LBF" and "Local Opt" utilizing different beamforming techniques, GUS and WS exhibit similar or better performance in terms of complexity and transmission between base stations when compared with "FS" and "IS".

Figure 9:
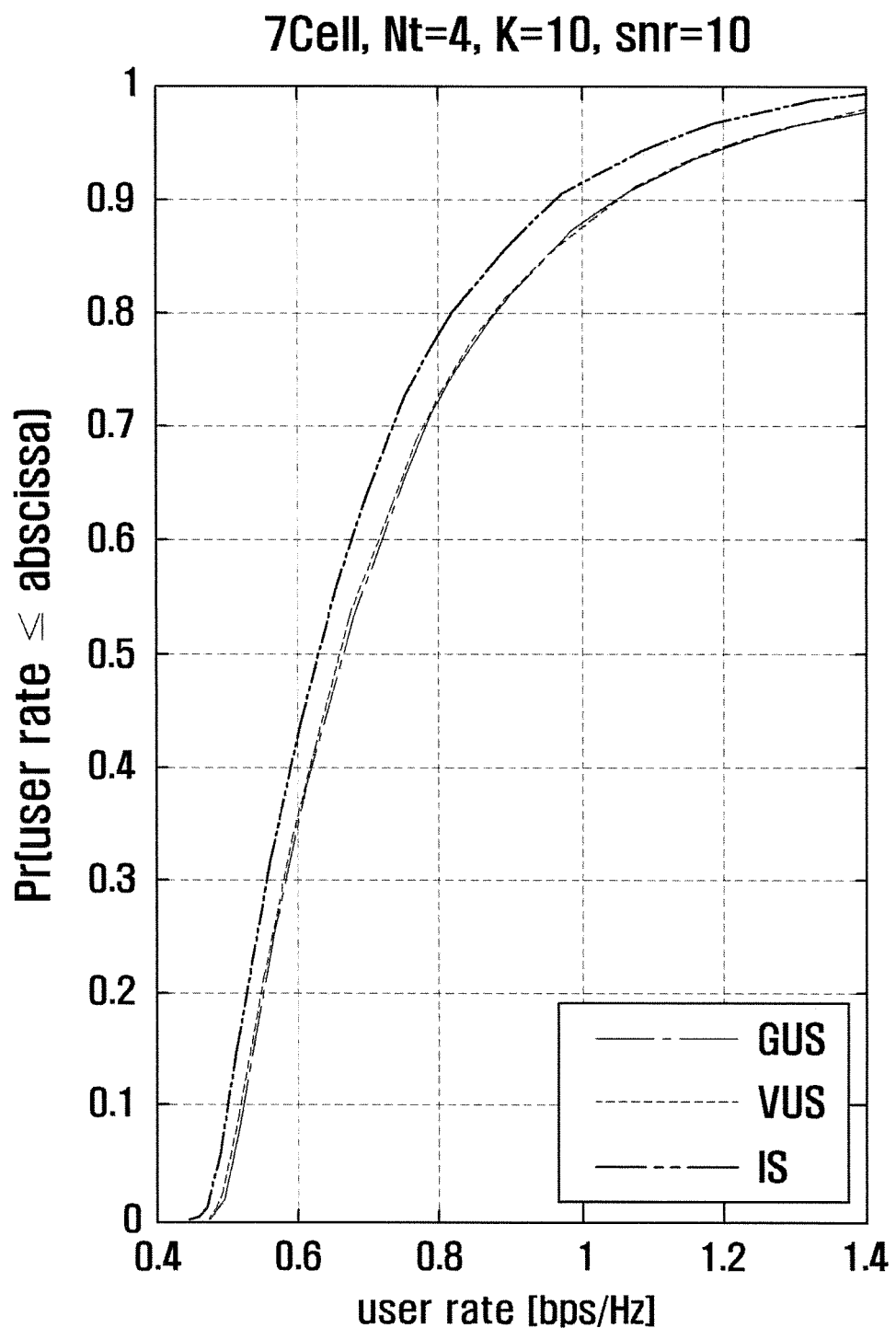
FIG. 9 shows the cumulative distribution function (CDF) of the method for user equipment selection with 7 cells, 4 antennas, 10 users and an SNR of 10 according to an embodiment of the present invention.
Figure 10:
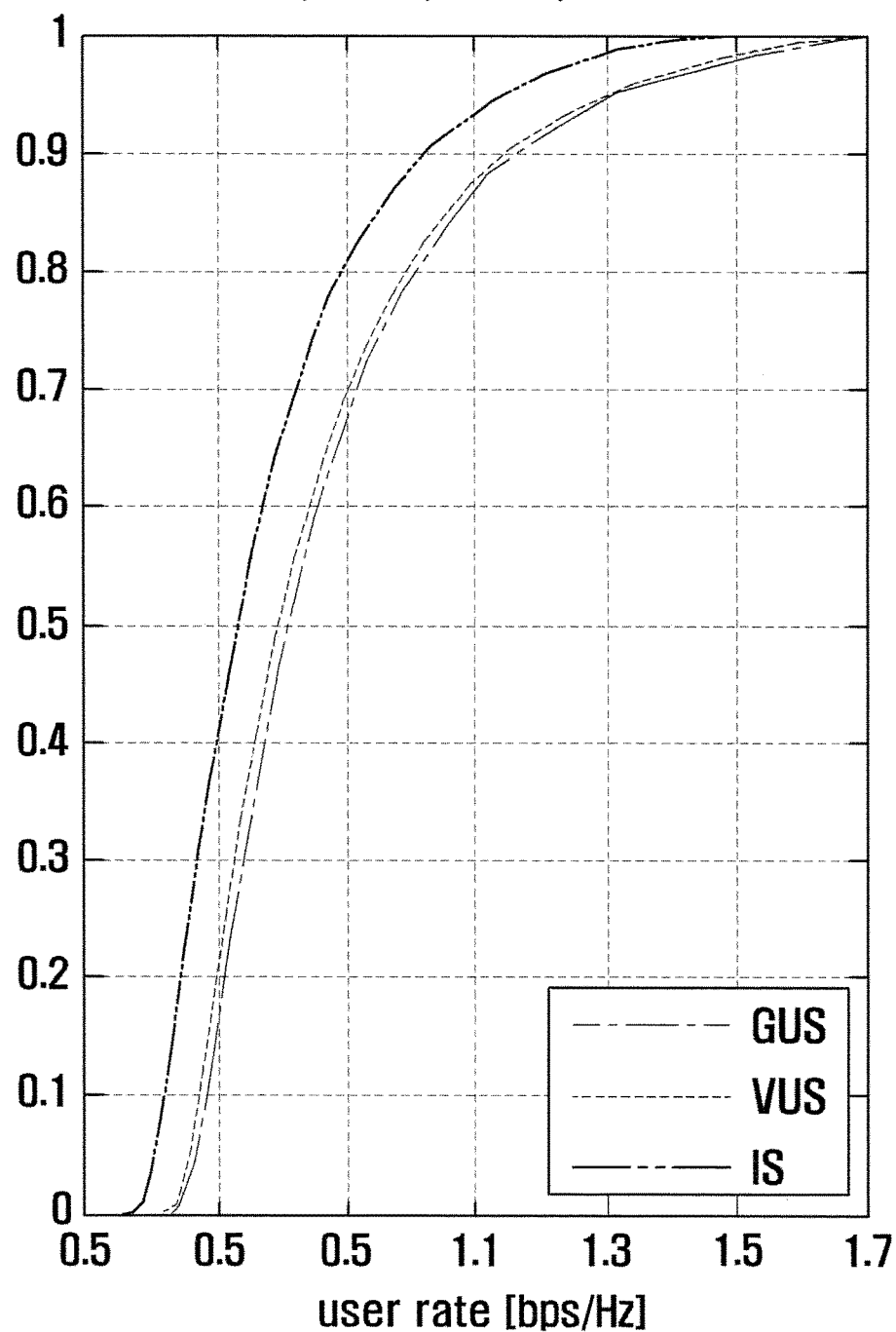
FIG. 10 shows the cumulative distribution function (CDF) of the method for user equipment selection with 7 cells, 4 antennas, 10 users and an SNR of 20 according to an embodiment of the present invention.

FIGS. 9 to 11 are related to cases where the number of cells, antenna and users varies. FIG. 9 shows the cumulative distribution function (CDF) of the method for user equipment selection with 7 cells, 4 antennas, 10 users and an SNR of 10 according to an embodiment of the present invention, FIG. 10 shows the cumulative distribution function (CDF) of the method for user equipment selection with 7 cells, 4 antennas, 10 users and an SNR of 20 according to an embodiment of the present invention, and FIG. 11 illustrates results of comparison between different schemes for a 7-cell, 4-antenna, 10-user case according to an embodiment of the present invention.

As can be seen further from FIGS. 9 to 11, the embodiments of the present invention exhibit better performance in terms of complexity and transmission between base stations when compared with other schemes.

FIG. 12 is a block diagram of an apparatus for user equipment selection according to an embodiment of the present invention.

The apparatus for user equipment selection according to the present invention may include a controller 1200 and a transceiver 1210.

The controller 1200 may control the overall operation of the apparatus for user equipment selection described before. The transceiver 1210 may communicate with base stations under control of the controller 1200.

Hereinabove, embodiments of the present invention have been described with reference to the accompanying drawings without limiting the subject matter of the present invention. It should be understood that many variations and modifications of the basic inventive concept described herein will still fall within the spirit and scope of the present invention as defined in the appended claims and their equivalents.

The invention claimed is:

1. A method by a central unit controlling at least two base stations in a mobile communication system, the method comprising:
receiving channel state information (CSI) of a plurality of user equipments (UEs) from a plurality of base stations;
selecting a first UE in a cell of a plurality of cells of the plurality of base stations, wherein the first UE comprises a maximum weight rate (WR) among the plurality of UEs;
selecting a second UE that maximizes a weighted sum rate (WSR) of a plurality of UEs belonging to cells different from a cell containing the first UE; and
transmitting scheduling information to each of the plurality of base stations based on the selection of the first UE and the second UE.

2. The method of claim 1, wherein selecting the second UE comprises:
identifying a maximum WSR by computing the WSR of the plurality of UEs belonging to the cells different from the cell containing the first UE;
comparing the identified maximum WSR with a WSR related to the first UE; and
selecting, if the identified maximum WSR is greater than the WSR related to the first UE, a UE that makes the identified maximum WSR as the second UE.

3. The method of claim 2, wherein identifying the maximum WSR comprises:
performing beamforming with the plurality of UEs belonging to the cells different from the cell containing the first UE;
computing WRs of the plurality of UEs belonging to the cells different from the cell containing the first UE using a signal-to-interference-plus-noise-ratio (SINR) computed based on global channel state information (global CSI); and
computing the WSR of the plurality of UEs based on the computed WRs.

4. The method of claim 3, wherein the WSR computation is performed using the following equation:

$$WSR(S_n)_{max} = \sum_{k_i \in S_n} w_{k_i} \log_2(1 + SINR_{k_i})$$

$$SINR_{k_i} = \frac{|h_{k_i,i}^H v_i|^2}{N_o + \sum_{j \neq i,l} |h_{k_i,j}^H v_j|^2 + |h_{k_i,l}^H v_l|^2},$$

where $S_n$ indicates a selected UE group, $k_i$ indicates a $k^{th}$ UE in an $i^{th}$ cell, $v_i$ indicates a beamforming vector of an $i^{th}$ base station, $h_{k,j}$ indicates a channel from a $j^{th}$ base station to a user ki, and $W_{ki}$ indicates a weight for a $k^{th}$ UE in the $i^{th}$ cell.

5. The method of claim 2, wherein identifying the maximum WSR comprises:
receiving weighted virtual rates (WVR) of the plurality of UEs belonging to the cells different from the cell containing the first UE; and
computing a weighted sum virtual rate (WSVR) using the received WVRs,
wherein the WVR computation is performed by the cells different from the cell containing the first UE based on local channel state information (local CSI).

6. The method of claim 5, wherein the WVR computation is performed using the following equation:

$$WVR = (w_{k_i} \log_2 \Pi_i^{-1}),$$

and wherein the WSVR computation is performed using the following equation:

$$WSVR(S_n)_{max} = \sum_{k_i \in S_n} w_{k_i} \log_2 \Pi_i^{-1}$$

$$\Pi_i = 1 - h_{k_i,i}^H \left( \sum_{j \neq l} h_{k_j,i} h_{k_j,i}^H + \frac{N_o}{P} I + h_{k_l,i} h_{k_l,i}^H \right)^{-1} h_{k_i,i},$$

where $S_n$ indicates a selected UE group, $k_i$ indicates a $k^{th}$ UE in an $i^{th}$ cell, $h_{k,j}$ indicates a channel from a $j^{th}$ base station to a user ki, and $W_{ki}$ indicates a weight for a $k^{th}$ UE in the $i^{th}$ cell.

7. The method of claim 2, further comprising:
checking whether a total number of the selected UEs is equal to a total number of cells; and
selecting, if the total number of the selected UEs is not equal to the total number of cells, a third UE.

8. The method of claim 7, further comprising stopping the UE selection if the total number of the selected UEs is equal to the total number of cells.

9. The method of claim 2, further comprising stopping the UE selection if the maximum WSR is less than the WSR of the first UE after the comparison.

10. A central unit controlling at least two base stations in a mobile communication system, the central unit comprising:
a transceiver configured to transmit and receive a signal; and
a controller configured to:
receive channel state information (CSI) of a plurality of user equipments (UEs) from a plurality of base stations,
select a first UE in a cell of a plurality of cells of the plurality of base stations, wherein the first UE comprises a maximum weight rate (WR) among the plurality of UEs,
select a second UE that maximizes a weighted sum rate (WSR) of a plurality of UEs belonging to cells different from a cell containing the first UE, and
transmit scheduling information to each of the plurality of base stations based on the selection of the first UE and the second UE.

11. The central unit of claim 10, wherein the controller is configured to select the second UE by:
identifying a maximum WSR by computing the WSR of the plurality of UEs belonging to the cells different from the cell containing the first UE,
comparing the identified maximum WSR with a WSR related to the first UE, and selecting, if the identified maximum WSR is greater than the WSR related to the first UE, a UE that makes the identified maximum WSR as the second UE.

12. The central unit of claim 11, wherein the controller is configured to identify the maximum WSR by:
performing beamforming with the plurality of UEs belonging to the cells different from the cell containing the first UE,
computing WRs of the plurality of UEs belonging to the cells different from the cell containing the first UE using a signal-to-interference-plus-noise-ratio (SINR) computed based on global channel state information (global CSI), and
computing the WSR of the plurality of UEs based on the computed WRs.

13. The central unit of claim 12, wherein the WSR computation is performed using the following equation:

$$WSR(S_n)_{max} = \sum_{k_i \in S_n} w_{k_i} \log_2(1 + SINR_{k_i})$$

$$SINR_{k_i} = \frac{|h_{k_i,i}^H v_i|^2}{N_o + \sum_{j \neq i,l} |h_{k_i,j}^H v_j|^2 + |h_{k_i,l}^H v_l|^2},$$

where $S_n$ indicates a selected UE group, $k_i$ indicates a $k^{th}$ UE in an $i^{th}$ cell, $v_i$ indicates a beamforming vector of an $i^{th}$ base station, $h_{k,j}$ indicates a channel from a $j^{th}$ base station to a user ki, and $W_{ki}$ indicates a weight for a $k^{th}$ UE in the $i^{th}$ cell.

14. The central unit of claim 11, wherein the controller is configured to identify the maximum WSR by:
receiving weighted virtual rates (WVR) of the plurality of UEs belonging to the cells different from the cell containing the first UE, and
computing a weighted sum virtual rate (WSVR) using the received WVRs,
wherein the WVR computation is performed by the cells different from the cell containing the first UE based on local channel state information (local CSI).

15. The central unit of claim 14, wherein the WVR computation is performed using the following equation:

$$WVR = (w_{k_i} \log_2 \Pi_i^{-1}),$$

and wherein the WSVR computation is performed using the following equation:

$$WSVR(S_n)_{max} = \sum_{k_i \in S_n} w_{k_i} \log_2 \Pi_i^{-1}$$

$$\Pi_i = 1 - h_{k_i,i}^H \left( \sum_{j \neq l} h_{k_j,i} h_{k_j,i}^H + \frac{N_o}{P} I + h_{k_l,i} h_{k_l,i}^H \right)^{-1} h_{k_i,i},$$

where $S_n$ indicates a selected UE group, $k_i$ indicates a $k^{th}$ UE in an $i^{th}$ cell, $h_{k,j}$ indicates a channel from a $j^{th}$ base station to a user ki, and $W_{ki}$ indicates a weight for a $k^{th}$ UE in the $i^{th}$ cell.

16. The central unit of claim 11, wherein the controller is configured to:
check whether a total number of the selected UEs is equal to a total number of cells, and
select a third UE if the total number of the selected UEs is not equal to the total number of cells.

17. The central unit of claim 16, wherein the controller is configured to stop the UE selection if the total number of the selected UEs is equal to the total number of cells.

18. The central unit of claim 11, wherein the controller is configured to stop the UE selection if the maximum WSR is less than the WSR of the first UE after the comparison.

* * * * *